(12) United States Patent
Folio

(10) Patent No.: US 7,057,666 B2  
(45) Date of Patent: Jun. 6, 2006

(54) SYSTEM AND METHOD FOR ENCODING INFORMATION INTO A VIDEO SIGNAL

(75) Inventor: Richard Folio, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 708 days.

(21) Appl. No.: 09/884,897

(22) Filed: Jun. 19, 2001

(65) Prior Publication Data

US 2002/0047921 A1    Apr. 25, 2002

Related U.S. Application Data (60) Provisional application No. 60/243,028, filed on Oct. 24, 2000.

(51) Int. Cl.
    *H04N 7/08* (2006.01)
(52) U.S. Cl. .................................................. 348/473
(58) Field of Classification Search ................ 348/473, 348/471, 472, 461, 463, 467; 386/26, 40, 386/45, 124; 360/32
    See application file for complete search history.

(56) References Cited

U.S. PATENT DOCUMENTS

| | | | |
|---|---|---|---|
| 3,889,054 A * | 6/1975 | Nagel et al. ............... 348/486 |
| 4,368,486 A | 1/1983 | Degoulet et al. ........... 358/146 |
| 4,855,827 A * | 8/1989 | Best ........................... 348/485 |
| 4,969,041 A | 11/1990 | O'Grady et al. ........... 358/142 |
| 5,023,727 A * | 6/1991 | Boyd et al. ................. 386/39 |
| 5,061,998 A * | 10/1991 | Yasuki et al. .............. 348/476 |
| 5,075,773 A * | 12/1991 | Pullen et al. .......... 375/240.01 |
| 5,200,822 A * | 4/1993 | Bronfin et al. ............. 725/22 |
| 5,243,423 A | 9/1993 | DeJean et al. ............. 358/142 |
| 5,280,479 A * | 1/1994 | Mary ........................ 370/462 |
| 5,309,290 A * | 5/1994 | Sugiyama et al. .......... 386/101 |
| 5,327,237 A | 7/1994 | Gerdes et al. ............. 348/476 |
| 5,386,240 A | 1/1995 | Hori ........................... 348/473 |
| 5,387,941 A | 2/1995 | Montgomery et al. ...... 348/473 |
| 5,410,360 A | 4/1995 | Montgomery ............... 348/473 |
| 5,557,333 A | 9/1996 | Jungo et al. ................ 348/473 |
| 5,557,334 A * | 9/1996 | Legate ....................... 348/473 |
| 5,572,247 A | 11/1996 | Montgomery et al. ......... 348/10 |
| 5,581,361 A * | 12/1996 | You et al. ...................... 386/46 |
| 5,587,743 A | 12/1996 | Montgomery et al. ...... 348/473 |
| 5,621,471 A | 4/1997 | Kim et al. .................. 348/473 |
| 5,663,766 A | 9/1997 | Sizer, II .................... 348/473 |
| 5,666,168 A | 9/1997 | Montgomery et al. ...... 348/473 |
| 5,666,170 A * | 9/1997 | Stewart ...................... 348/726 |
| 5,708,476 A | 1/1998 | Myhrvold et al. .......... 348/473 |
| 5,737,025 A * | 4/1998 | Dougherty et al. ......... 348/473 |
| 5,737,026 A * | 4/1998 | Lu et al. .................... 348/473 |
| 5,739,864 A | 4/1998 | Copeland ................... 348/473 |

(Continued)

FOREIGN PATENT DOCUMENTS

WO    95/29558    11/1995

(Continued)

*Primary Examiner*—Paulos M. Natnael  
(74) *Attorney, Agent, or Firm*—Allen, Dyer, Doppelt, Milbrath & Gilchrist, P.A.

(57) ABSTRACT

A system (10) and method of the present invention encodes information into a video signal by substituting luminance information within the video signal with a modulated frame of content data on one or more lines of the active portion of the video signal to provide an additional information channel on the video signal. A modulation and video synchronization circuit (32) converts content data into at least one modulated frame of content data having video synchronization information. An interleaver (34) is operatively connected to the modulation and video synchronization circuit (32) and interleaves the modulated frame of content data within at least one selected line of the video signal.

30 Claims, 7 Drawing Sheets

U.S. PATENT DOCUMENTS

| | | | | |
|---|---|---|---|---|
| 5,796,781 A * | 8/1998 | DeAndrea et al. | ........... | 375/288 |
| 5,808,889 A * | 9/1998 | Burgess | ...................... | 348/476 |
| 5,809,209 A * | 9/1998 | Hoshi et al. | ................. | 386/124 |
| 5,859,670 A * | 1/1999 | Van Gestel | ................. | 348/473 |
| 5,907,366 A * | 5/1999 | Farmer et al. | ............... | 348/478 |
| 5,929,920 A | 7/1999 | Sizer, II | ..................... | 348/473 |
| 5,946,047 A | 8/1999 | Levan | ........................ | 348/473 |
| 5,946,048 A | 8/1999 | Levan | ........................ | 348/473 |
| 5,960,081 A * | 9/1999 | Vynne et al. | ................ | 713/176 |
| 6,040,870 A * | 3/2000 | Small | ......................... | 348/476 |
| 6,055,020 A | 4/2000 | Lorenz et al. | .............. | 348/473 |
| 6,064,440 A | 5/2000 | Born et al. | ................. | 348/478 |
| 6,094,228 A | 7/2000 | Ciardullo et al. | ........... | 348/473 |
| 6,211,919 B1 * | 4/2001 | Zink et al. | .................. | 348/473 |
| 6,246,439 B1 * | 6/2001 | Zink et al. | .................. | 348/473 |
| 6,278,739 B1 * | 8/2001 | Enomoto et al. | ...... | 375/240.26 |
| 6,295,093 B1 * | 9/2001 | Park et al. | ................... | 348/473 |
| 6,480,545 B1 * | 11/2002 | Symes | .................... | 375/240.26 |
| 6,556,247 B1 * | 4/2003 | Ranta et al. | ................ | 348/476 |
| 6,591,391 B1 * | 7/2003 | Rowenhorst et al. | ....... | 714/756 |
| 6,636,268 B1 * | 10/2003 | Ngai | .......................... | 348/478 |
| 6,742,188 B1 * | 5/2004 | Del Castillo | ................ | 725/153 |

FOREIGN PATENT DOCUMENTS

| | | |
|---|---|---|
| WO | 96/27264 | 9/1996 |
| WO | 96/31963 | 10/1996 |
| WO | 00/35195 | 6/2000 |

* cited by examiner

| SYMBOL TABLE | DECIMAL Y VALUE | SINGLE R' VALUE | 15 BIT RGB | 24 BIT RGB |
|---|---|---|---|---|
| NULL | 127 | 15 | 15855 | 8092539 |
| 0 | 63 | 8 | 8456 | 4342338 |
| 1 | 191 | 23 | 24311 | 12434877 |

SYSTEM AND METHOD FOR ENCODING INFORMATION INTO A VIDEO SIGNAL

RELATED APPLICATION

This application is based upon prior filed provisional application Ser. No. 60/243,028 filed Oct. 24, 2000 now abandoned.

FIELD OF THE INVENTION

This invention relates to the field of video signal encoding, and more particularly, this invention relates to a system for encoding information into a video signal by inserting new data content into an active portion of the video signal.

BACKGROUND OF THE INVENTION

Television broadcasts, consumer video tape, different stored multimedia video formats, and live or taped over-the-air broadcasts are becoming increasingly more complex, having numerous channel formats, and increased requirements for adding new services and data associated with these systems. Different methods of transmission have been used for inserting content data containing additional information into the video signals of various broadcasting formats, including National Television System Committee (NTSC), Digital Advanced Television Systems Committee (ATSC), Sequentiel Couleur a Memoire (SECAM), or Phase Alternation Line (PAL) compliant broadcasting formats. Both the active and blank portions have been used. Different modifications to the luminance and chrominance carriers have been commonly exploited, such as teletex, where textual information is substituted for the video portion of the signal in the active portion of the video signal.

Other known data insertion techniques include the insertion of data into the vertical and horizontal blanking intervals of a video signal. A well known example is a closed captioning system used primarily as an aid to the hearing impaired community. With this type of data insertion technique, textual data is encoded into the vertical blanking intervals.

These prior art techniques have been fully exploited by different vendors, and thus, an additional method of transporting any content data is required. One technique, as disclosed in U.S. Pat. Nos. 5,663,766 and 5,929,920 to Sizer, II, assigned to Lucent Technologies Inc., adds a carrier signal that has been modulated by digital information into a video signal. This modulated carrier signal is at other than a frequency corresponding to a peak in the video spectrum. A receiver is arranged to sense optically the video signal and recover any encoded digital content data. Thus, the receiver optically views a screen luminance. This is not desirable for some applications because a receiver/decoder in that application must optically view screen luminance to recover the encoded digital content data.

SUMMARY OF THE INVENTION

The above-mentioned drawbacks are overcome by the present invention where an additional transmission channel is provided in the active portion of a video signal. This is accomplished without adversely affecting the visual content of any displayed video on an average consumer video display, such as a television. The video content is substituted with content data within the active portion of the video signal. For example, the luminance information is substituted with a modulated frame of content data on one or more lines of the active portion of a video signal rather than the vertical or horizontal blanking intervals. This provides the additional transmission channel for the content data.

In one aspect of the present invention, the system includes a data modulation and video synchronization circuit for converting content data into at least one modulated frame of content data having video synchronization information. An interleaver is operatively connected to this circuit for interleaving the modulated frame of content data within at least one selected line of a video data stream, which is modulated into a video signal compliant with broadcasting standards. A decoder receives the video signal that has been encoded with the content data and extracts the content data. The decoder includes a line deinterleaver for separating video lines from a video data stream into a modulated frame of content data. A DC restoration circuit restores a DC bias level for any content data. A bit and frame synchronizer circuit synchronizes the modulated frame of content data, which is followed by a demodulator/decode circuit that demodulates and decodes the modulated frame of content data into the content data.

In yet another aspect of the present invention, a video signal decoder circuit receives a video signal that is compliant with a broadcasting format and converts the video signal into a video data stream to be encoded with content data. This video signal is compliant with a broadcasting format that comprises one of a National Television System Committee (NTSC), Digital Advanced Television Systems Committee (ATSC), Sequentiel Couleur a Memoire (SECAM), or Phase Alternation Line (PAL) compliant broadcasting format.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 4:
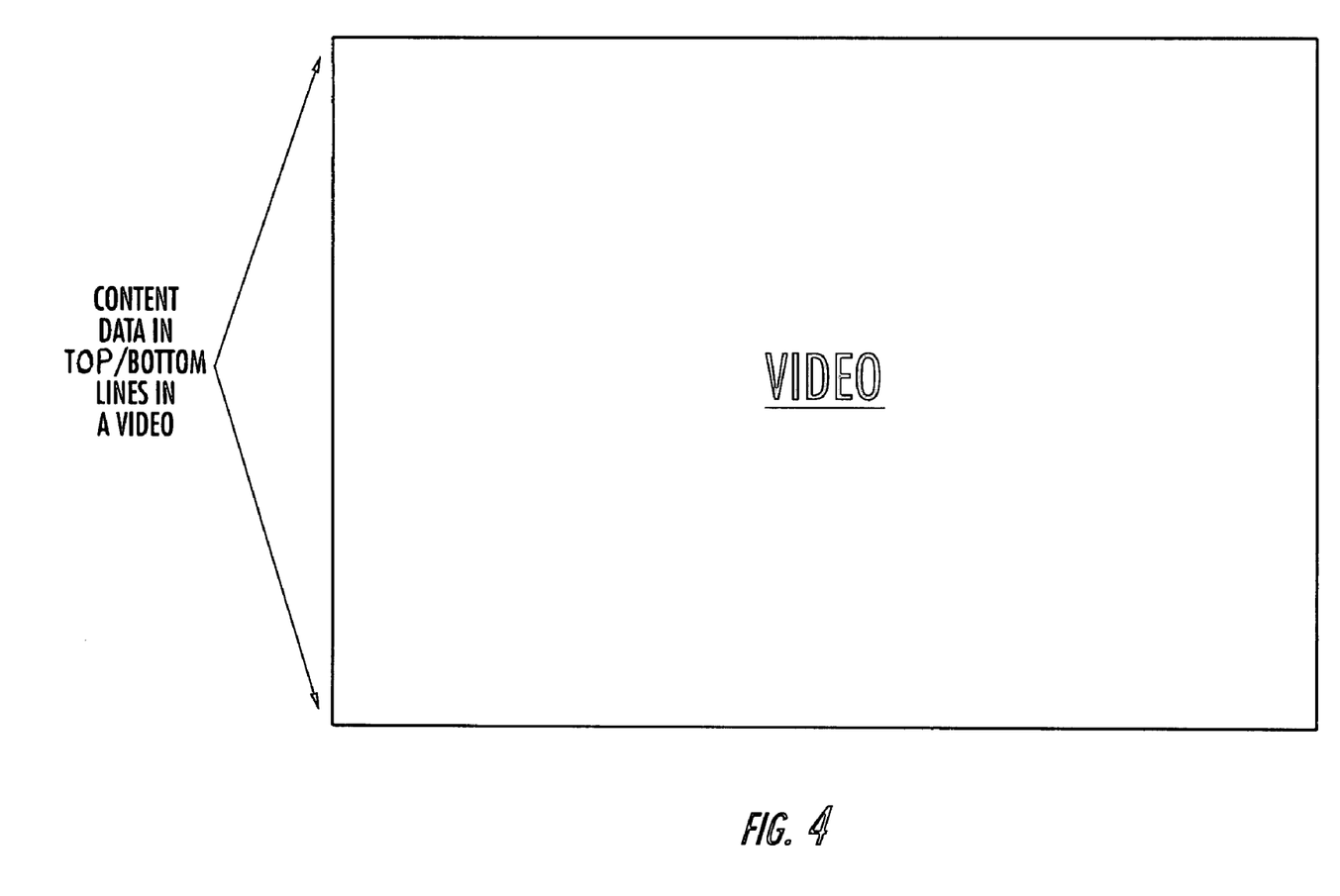
FIG. 4 is an example of a video frame showing a modulated frame of content data substituted within top and bottom video lines.

The present invention is advantageous and provides an additional transmission channel in the active portion of a video signal without adversely affecting the visual content of video display, such as an average consumer television or other video display device. It allows the substitution of certain amounts of video with content data within the active portion of a video signal. In its most general form, the present invention substitutes luminance information with a modulated frame of content data on one or more lines of the active portion of a video signal rather than on the vertical or horizontal blanking intervals as is typical in many prior art applications. This provides a beneficial and additional transmission channel for content data. As shown in FIG. 4, luminance information within the video signal has been substituted with a modulated frame of content data on one or more lines of the active portion of the video signal, preferably in the top and bottom video lines in the video signal. These lines typically correspond to the top or bottom of a video display that are substantially or partially shadowed from viewing.

The present invention can be used with many different types of video signals, including stored video tape, various multimedia formats, such as AVI files with active video frames, and live or taped over-the-air broadcasts. Any broadcast video signal is preferably compliant with National Television System Committee (NTSC), Digital Advanced Television Systems Committee (ATSC), Sequentiel Couleur a Memoire (SECAM), or Phase Alternation Line (PAL) compliant broadcasting format video signals.

Figure 1:
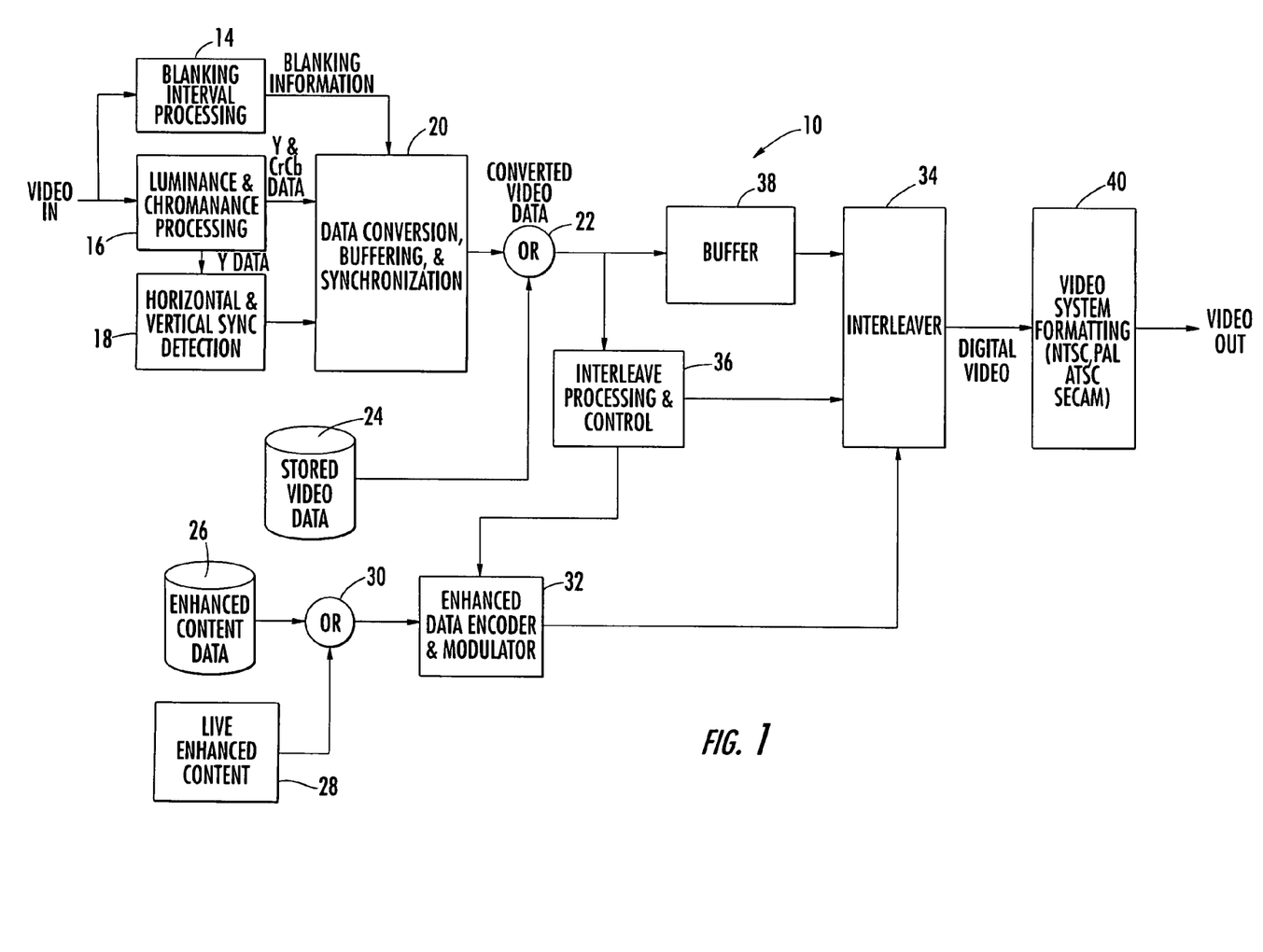
FIG. 1 is a block diagram of the system for encoding information into an exemplary National Television System Committee (NTSC) video signal and showing basic circuits of the invention including an interleaver and video signal formatting circuit.
Figure 2:
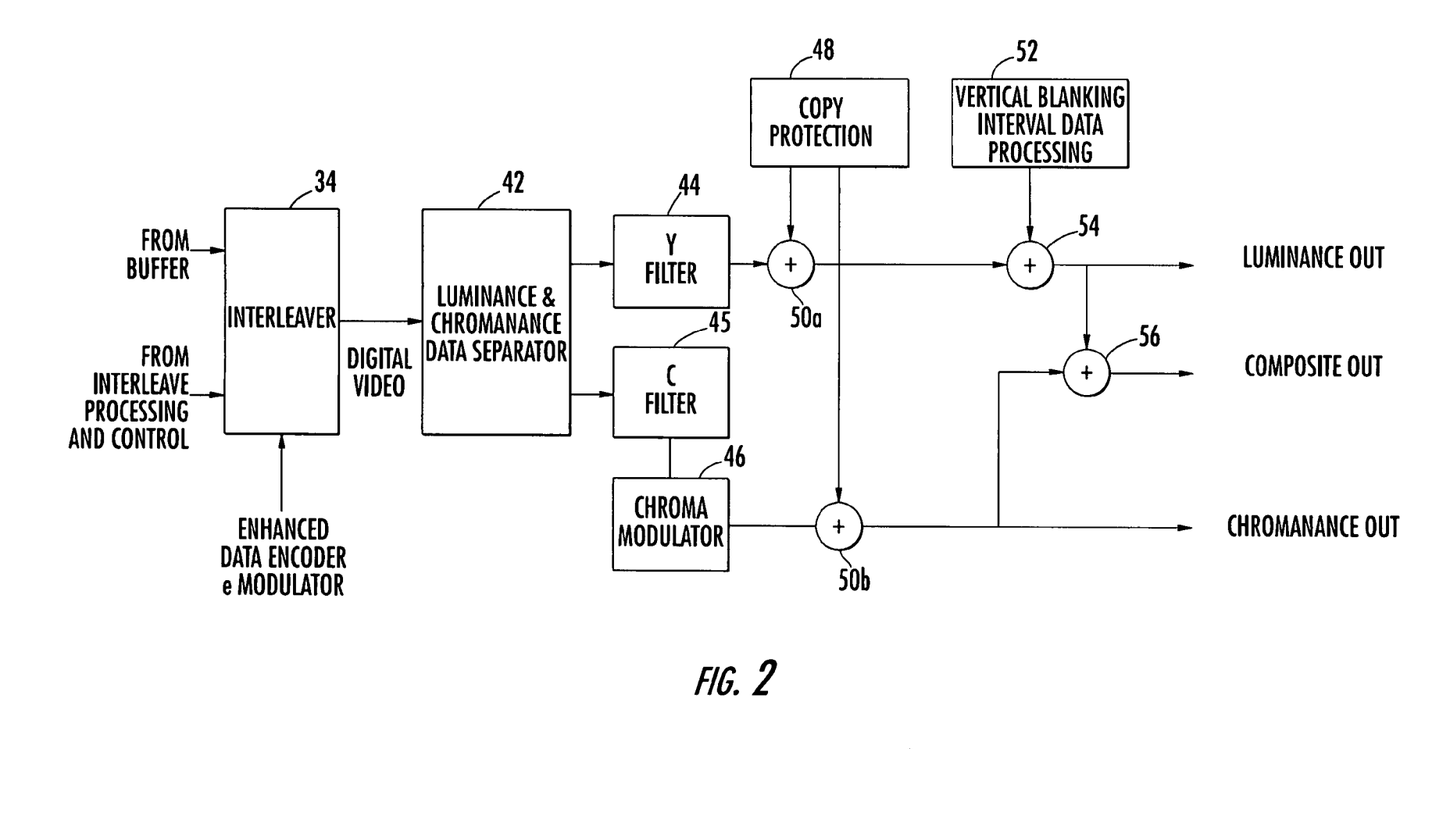
FIG. 2 is another block diagram of a portion of the system for encoding information shown in FIG. 1 and showing in greater detail an exemplary video signal formatting circuit for use with a National Television System Committee (NTSC) compliant broadcasting format.
Figure 3:
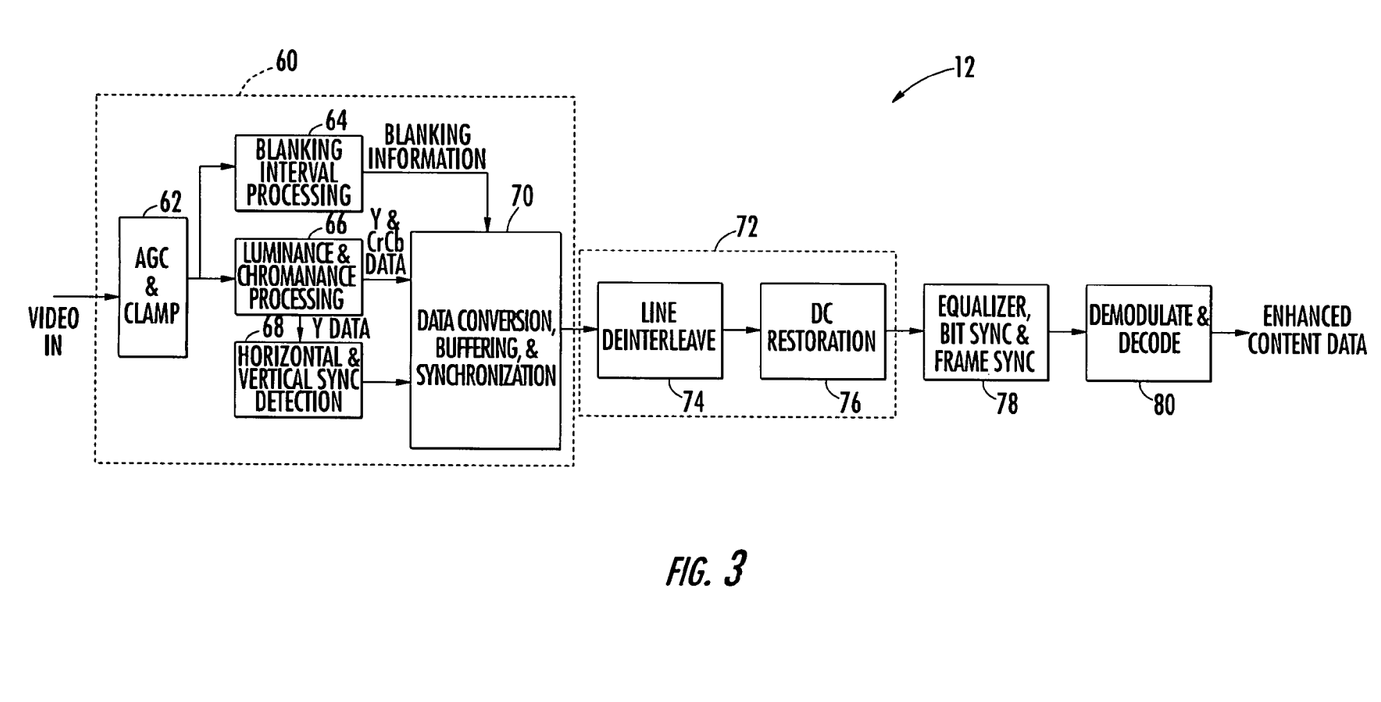
FIG. 3 is a block diagram of a decoder that can be used in the present invention for extracting the content data from a video signal that has been encoded with content data in accordance with the present invention.

FIGS. 1–3 illustrate a basic block diagram of the overall system 10 of the present invention for encoding information as content data onto a video signal (FIGS. 1 and 2), and a decoder 12 (FIG. 3) used for decoding the video signal that has had a modulated frame of content data substituted onto one or more lines of the active portion of the video to provide the additional information channel.

Although the basic block circuit diagrams will vary depending on design changes made by those skilled in the art, the description will proceed relevant to a video signal that is compliant with the National Television System Committee (NTSC) broadcasting format standards.

As shown in FIG. 1, an NTSC video signal enters basic video processing circuits, as known to those skilled in the art, including a blanking interval processing circuit 14, and luminance and chrominance processing circuit 16. Y video information signals are forwarded from the luminance and chrominance processing circuit 16 into a horizontal and vertical synchronization and detection circuit 18, using basic video processing circuitry, as known to those skilled in the art. A data conversion, buffering and synchronization circuit 20 receives blanking information signals from the blanking interval processing circuit 14, and Y and CrCb data from the luminance and chrominance processing circuit 16. Detected signals are also received from the horizontal and vertical synchronization detection circuit 18. The data conversion, buffering and synchronization circuit converts the broadcast compliant video signal into an appropriate video data stream for interleaving, as explained below. An OR circuit 22 allows processing of stored video data received from a stored video database 24, and acts as a switch for choosing sources of video signals, or could merge video from the two sources.

Content data stored on an enhanced content database 26 and video from a live enhanced content data stream 28 are selected or merged in OR circuit 30 for later modulation within a modulation and video synchronization circuit 32, labeled the Enhanced Data Encoder and Modulator. This circuit 32 converts the content data received from the enhanced content database 26 or live enhanced content data stream 28 into at least one modulated frame of data having video synchronization information to be passed to an interleaver 34. This circuit 32 also adds any appropriate error coding information, such as by encapsulation, and video synchronization information, including bit and frame markers, by techniques known to those skilled in the art.

At the same time, a portion of the video data stream is passed to an interleave processing and control circuit 36 that works in conjunction with the modulation and video synchronization circuit 32 and the interleaver 34 for timing and proper interleaving of modulated frames of content data with the video data stream. The interleaver receives the video data stream from a buffer circuit 38 for proper buffering and timing and interleaves the modulated frame of content data within at least one selected line of the video data stream, as noted before.

As shown in FIG. 4, one aspect of the present invention allows interleaving of the modulated frame of data within the top and bottom video lines in a video signal corresponding to the top and bottom of a video display that is substantially shadowed from viewing. The digital video is output from the interleaver 34 into a video signal formatting circuit 40 that receives the video data stream after interleaving, and formats the video data stream by techniques known to those skilled in the art into a video signal that is compliant with a known broadcasting format. In the example of the present invention, as shown in FIG. 2, the broadcasting format is an NTSC broadcasting format. Naturally, other formats besides the listed NTSC, PAL, ATSC, or SECAM format can be used in the present ivention.

As shown in FIG. 2, where the video data stream is formatted into a video signal with the NTSC standard, the video signal formatting circuit includes a luminance and chrominance data separator circuit 42 that receives the digital video data stream from the interleaver 34. It forwards separated data signals to the respective Y filter circuit 44 and C filter circuit 45, which in turn is connected to the chroma modulator circuit 46, as known to those skilled in the art. Copy protection information 48 is added via summing circuits 50a, 50b to the signal received from the Y filter circuit 44 and chroma modulator circuit 46. A vertical blanking and interval data processing circuit 52 is connected to a summing circuit 54 that is connected to the Y filter summing circuit 50a and outputs a luminance out signal. A part of this signal is forwarded to a summing circuit 56 that receives part of the copy protected chroma modulator signal from summing circuit 50b for a composite out signal. A chrominance out signal is received from the summing circuit 50b. This technique is known to those skilled in the art.

A decoder 12 that can be used with the present invention is shown in FIG. 3. The dashed line configuration illustrated at 60 corresponds to a standard video processing chip, such as an Intersil 8117 video processing chip. The chip 60 includes standard video processing functional components, including an automatic gain control and clamping circuit 62. From that circuit 62, the signal is processed with a blanking interval processing circuit 64, luminance and chrominance processing circuit 66 for outputting Y data and Y and CrCb data, and a horizontal and vertical synchronization detection circuit 68 that receives the Y data. A data conversion, buffering and synchronization circuit 70 receives the blanking information from the blanking interval processing circuit 64, Y and CrCb data from the luminance and chrominance processing circuit 66, and the synchronization signals from the horizontal and vertical synchronization detection circuit 68. This circuit 70 digitally processes the video signal into a video data stream in accordance with techniques known to those skilled in the art.

A line separation and restoration circuit shown by dashed configuration 72 extracts the modulated frame of content data from the video data stream. As illustrated, a line deinterleaver circuit 74 separates video lines having the encoded content data from the video data stream into a modulated frame of data. A DC restoration circuit 76 restores the DC bias level for the content data. This circuit works as a DC process control and determines mid-level video information, such as whether it is RGB that has been converted to a single composite or luminance and what is available for use. Thus, luminance values can be peeled away at this point in time. The DC restoration is done on these values and can act as a secondary DC restoration because the top and bottom ranges can be known based on the incoming signal.

A bit and frame synchronizer circuit 76 determines frame markers and frame sequences as part of the encoding sequence. These had been encoded as part of the synchronization in the original encoding. This circuit can determine marker sequence and synchronize with an independent sampling rate by techniques known to those skilled in the art. As is known, it also can remove system noise and transmission artifacts by processing circuits and techniques. This bit and frame synchronizer circuit 78 can include an equalizer if higher order modulating techniques are used. A demodulator/decode circuit 80 demodulates and decodes the modulated frame of data into the content data. The content data is thus retrieved.

Figures 5, 6:
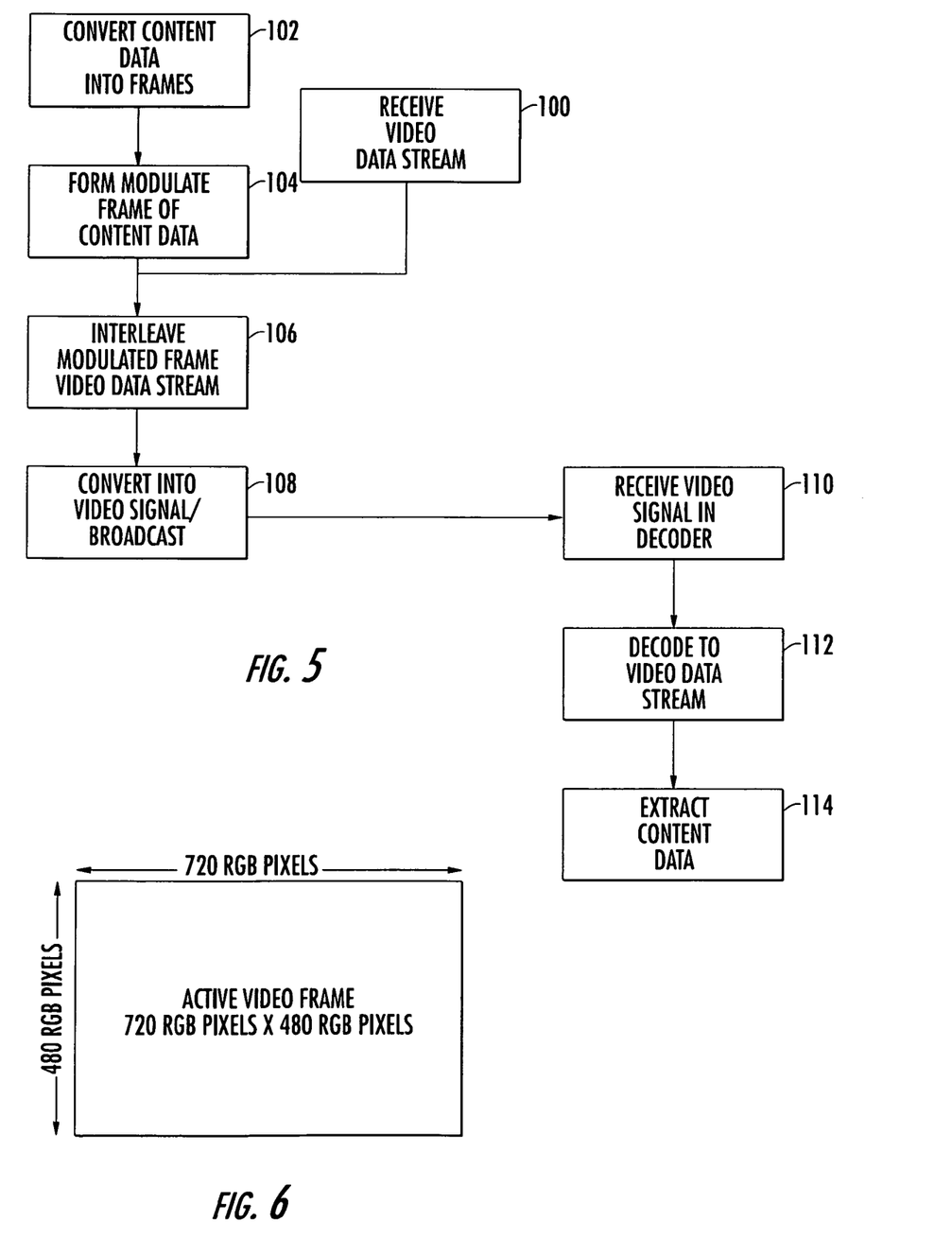
FIG. 5 is a high level flow chart illustrating a method of operation in accordance with the present invention.
FIG. 6 illustrates an active video frame for an AVI file or a CCIR data stream that can be used with the present invention.
Figure 5:
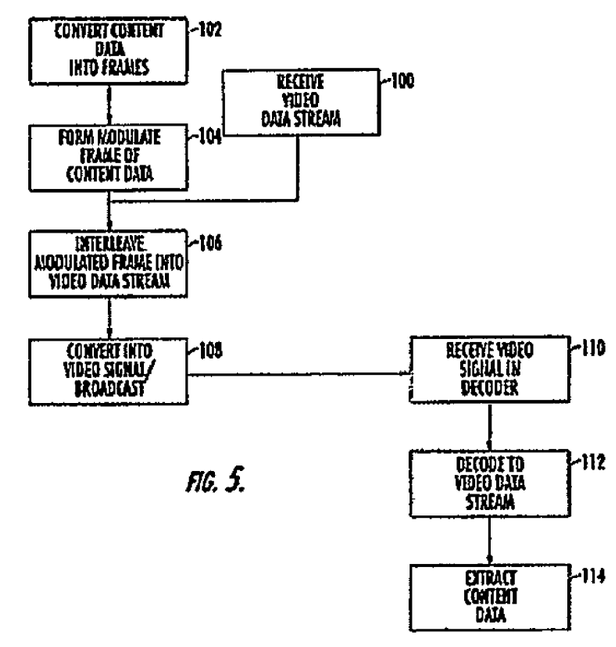

FIG. 5 illustrates a basic high level flow chart showing the basic method of processing a video signal in accordance with the present invention. A video data stream is received to be enhanced with the content data (block 100). The content data is received and converted into frames of content data (block 102). Synchronization information and modulation data is added into the frame of content data to form a modulated frame of content data (block 104). The modulated frame of content data is interleaved within at least one selected video line of the video data stream (block 106). The video data stream is converted into a video signal and broadcast (block 108). The video signal is received within a decoder (block 110) and decoded into a video data stream (block 112). The content data is extracted from the video data stream (block 114).

Referring now to FIGS. 5–6, an interleaving process description is shown for interleaving AVI files. For example, in one aspect, it is assumed that an AVI file to be enhanced with the content data is opened such that individual frames of a video picture are available for modification. For example, the video could be 29.97 FPS, as an example, to operate. Several lines could be substituted in every frame of the AVI file. This AVI file could be constructed to have 480 by 720 RGB pixels to form an active video frame (FIG. 6), although other pixel resolutions can be used. The RGB pixel can be assumed to be a 15 bit pack representation, i.e., XRRRRRGGGGGBBBBB.

Figure 7:
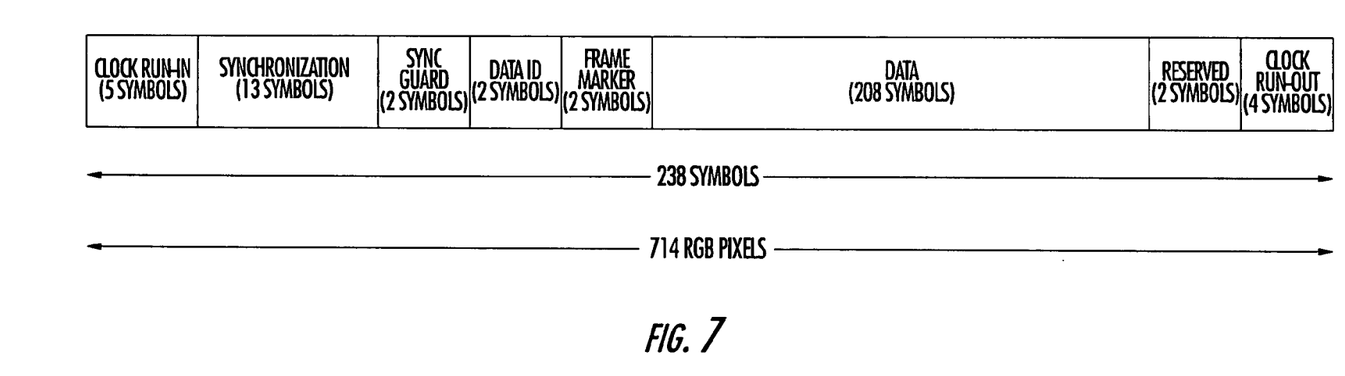
FIG. 7 is an example of a line of information that can be substituted into a video line of the active video frame.

As shown in FIG. 7, a line of information that could be substituted into the video line includes a clock run-in as five symbols, synchronization data as 13 symbols, a synchronization guard as two symbols, a data ID as two symbols, a frame marker as two symbols, data content as 208 symbols, a reserved space of two symbols, and a clock run-out of four symbols, to form a total of 238 symbols with 714 RGB pixels, as a non-limiting example. This line can be inserted with the distinct data fields and can be generated such as from the table shown in FIG. 8. Naturally, different techniques to construct the frame marker and data field can be used as suggested by techniques known to those skilled in the art.

Figure 8:
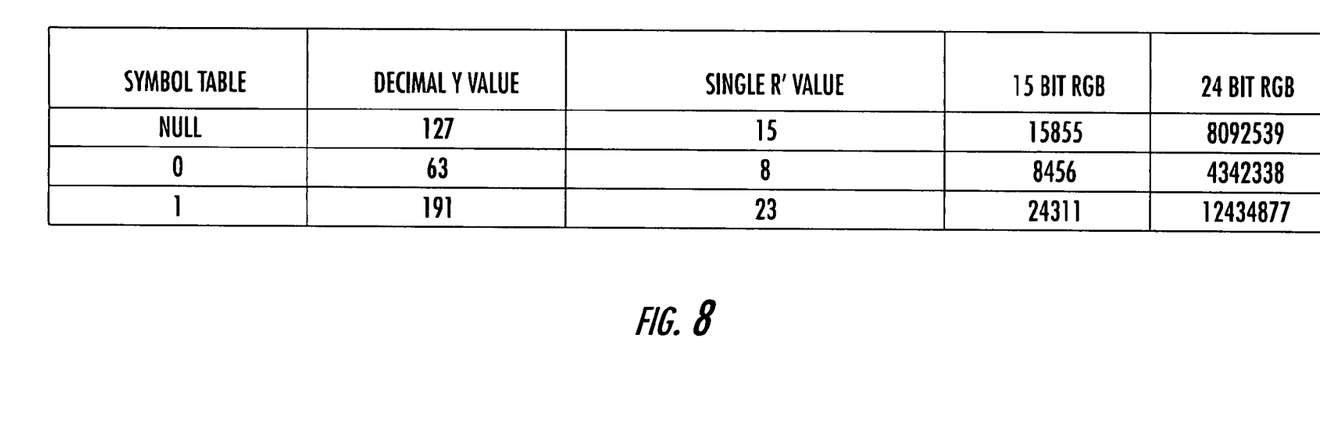
FIG. 8 is a table showing what kind of symbols can be generated for an interleaving process for the active video frame of FIG. 6.

Although the description relative to FIGS. 6–8 describes an interleaving process for AVI files for use with MP3 audio data or other data, other techniques can be used as suggested to those skilled in the art.

Figure 9:
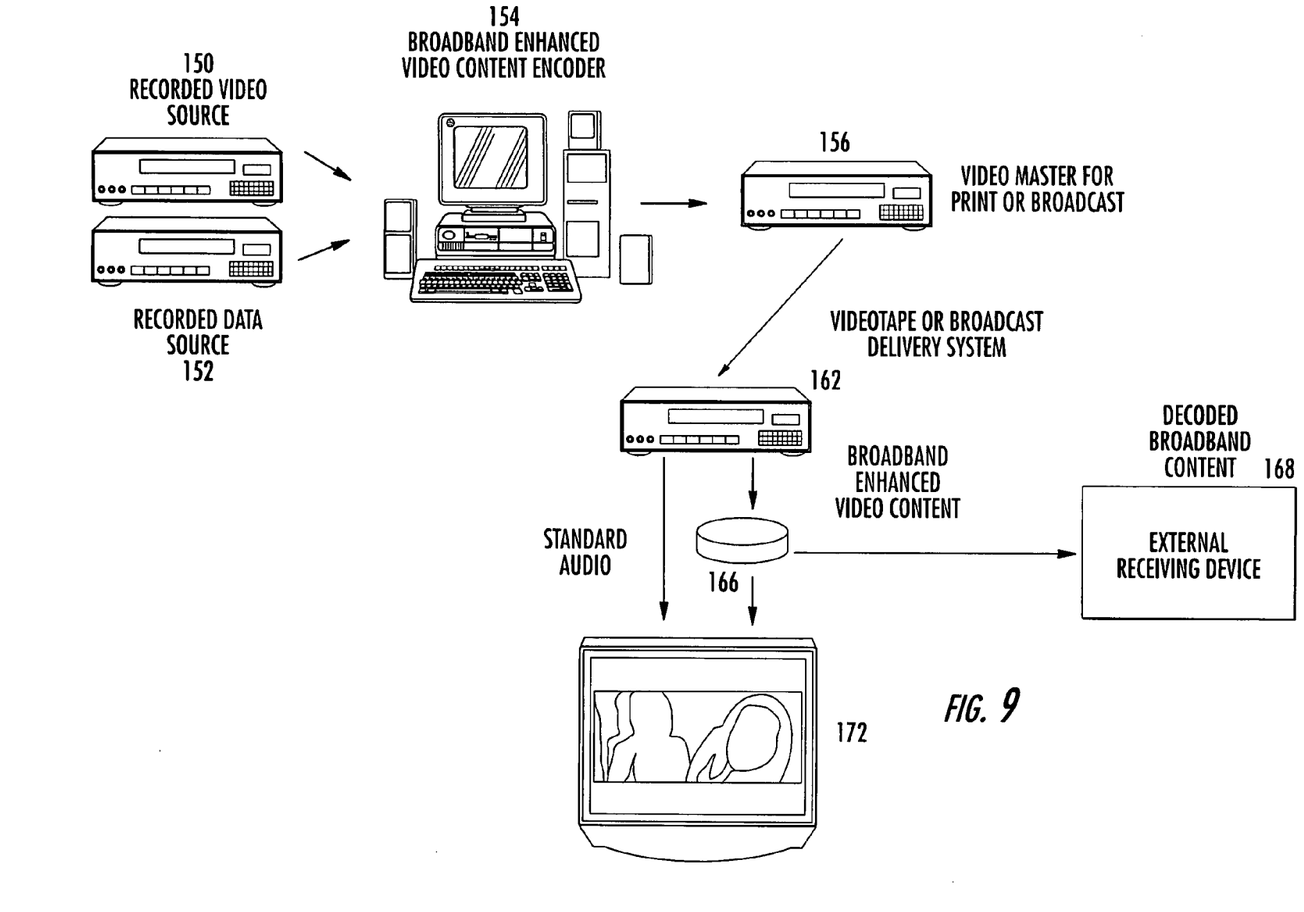
FIG. 9 is an overall system view showing use of the present invention by a consumer at a residential premises.

FIG. 9 illustrates how a residential consumer located at a residential premises could use the system of the present invention. A recorded video source 150 or recorded description source 152 could be obtained from a standard video and encoded by a computer system 154 having appropriate encoding software and algorithms using the system of the present invention to form a broadband enhanced video content, which is then forwarded to a video master 156 for print or broadcast. The video tape or broadcast delivery allows consumer receipt at a residential premises in a standard VCR, DVD, DSS or cable unit 162 and the broadband enhanced video content is decoded in a broadband content decoder 166 of the present invention. Decoder data is supplied to external receiving device 168 for further processing. A standard television 172 is shown as receiving the video signal.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A system for encoding information into a video data stream of a video signal comprising:
    a modulation and video synchronization circuit for converting content data into at least one modulated frame of data having content data and video synchronization information; and
    an interleaver operatively connected to said modulation and video sychronization circuit for interleaving the modulated frame of data into only the top and/or bottom line of the video data stream by substituting the modulated frame of data into only the single top and/or bottom video line containing luminance information wherein the modulated frame of data having content data and video synchronization information is limited to fit only within the top and/or bottom video line.

2. A system according to claim 1, and further comprising a decode circuit for receiving the video data stream that has been encoded with the content data and extracting the content data therefrom.

3. A system according to claim 2, wherein said decode circuit further comprises a line deinterleaver for separating video lines having the encoded content data from the video data stream into a modulated frame of content data.

4. A system according to claim 3, wherein said decode circuit further comprises a DC restoration circuit that restores a DC bias level for any content data in the modulated frame of data.

5. A system according to claim 3, wherein said decode circuit further comprises a bit and frame synchronizer circuit for synchronizing the modulated frame of content data.

6. A system according to claim 3, wherein said decode circuit further comprises demodulator/decode circuit for demodulating and decoding the modulated frame of content data into the content data.

7. A system according to claim 1, and further comprising a video signal decoder circuit for receiving a video signal that is compliant with a broadcasting format and converting the video signal into the video data stream to be encoded with content data.

8. A system according to claim 7, wherein the video signal that is compliant with a broadcasting format comprises one of a National Television System Committee (NTSC), Digital Advanced Television Systems Committee (ATSC), Sequentiel Couleur a Memoire (SECAM), or Phase Alternation Line (PAL) compliant broadcasting format.

9. A system according to claim 1, and further comprising a video signal formatting circuit operatively connected to said interleaver for receiving the video data stream after interleaving with the modulated frame of content data and formatting the video data steam into a video signal that is compliant with a broadcasting format.

10. A system according to claim 9, and further comprising a decode circuit for receiving the video signal that has been encoded with the content data and extracting the content data.

11. A system according to claim 10, wherein said decode circuit comprises:
a video signal decoder for converting the video signal into a video data steam; and
a line separation and restoration circuit that extracts the content data from the video data stream.

12. An encoder for encoding information into a video data stream comprising:
a modulation and video synchronization circuit for converting content data into at least one modulated frame of data having content data and video synchronization information and error coding information;
an interleaver for receiving a video data stream and a modulated frame of content data having video synchronization information and interleaving the modulated frame of data within only the top and/or bottom video line of the video data stream that is substantially shadowed from viewing on a video display by substituting the modulated frame of data into single top and/or bottom video line containing luminance information; and
an interleave processing and control circuit operative with the modulation and video synchronization circuit and interleaver for timing and proper interleaving of modulated frames of content data with the video data stream wherein the modulated frame of data having content data and video synchronization information is limited to fit only within the top and/or bottom video line.

13. An encoder according to claim 12, and further comprising a video signal decoder circuit for receiving a video signal that is compliant with a broadcasting format and converting the video signal into the video data stream to be encoded with content data.

14. A decoder for decoding a video signal where luminance information has been substituted with a modulated frame of content data and video synchronization information on a single top and/or bottom video line of an active portion of the video signal to provide an additional information channel on the video signal wherein the modulated frame of data having content data and video synchronization information is limited to fit only within the top and/or bottom video line comprising:
a video signal decoder for converting the video signal into a video data stream; and
a line separation and restoration circuit that extracts the content data from the single top and/or bottom line of the active portion of the video signal, wherein said line separation and restoration circuit further comprises a line deinterleaver for separating video lines having the encoded content data from the video data stream into a modulated frame of content data.

15. A decoder according to claim 14, wherein said line separation and restoration circuit further comprises a DC restoration circuit operatively connected to said line deinterleaver and operative on said video data stream for restoring a DC bias level to content data encoded within the modulated frame of data.

16. A decoder according to claim 14, and further comprising a bit and frame synchronizer circuit for synchronizing the modulated frame of content data.

17. A decoder according to claim 14, and further comprising a demodulator/decode circuit for demodulating and decoding the modulated frame of content data into the content data.

18. A method for encoding information into a video signal comprising the step of:
substituting luminance information within the video signal with a modulated frame of content data and video synchronization information by substituting the modulated frame of content data and video synchronization information into a single top and/or bottom video lie containing luminance information to provide an additional information channel on the video signal wherein the modulated frame of data having content data and video synchronization information is limited to fit only within the top and/or bottom video line; and
forming the modulated frame of data by encapsulating a frame of content data with video synchronization information.

19. A method according to claim 18, and further comprising the step of embedding a frame sequence and frame marker for synchronization.

20. A method according to claim 18, and further comprising the step of forming the modulated frame of content data by coding a stream of content data with error correction and modulation information.

21. A method according to claim 18, and further comprising the step of formatting the video signal for transmission as one of a National Television System Committee (NTSC), Digital Advanced Television Systems Committee (ATSC), Sequentiel Couleur a Memoire (SECAM), or Phase Alternation Line (PAL) compliant broadcasting format video signal.

22. A method according to claim 21, and further comprising the step of receiving the video signal after broadcast in a broadcasting format and extracting the content data that had been substituted into the video signal as the additional information channel.

23. A method for encoding information into a video signal comprising the steps of:
receiving a video signal as a video data stream to be enhanced with content data;
converting content data into at least one frame of content data;
adding video synchronization information and modulation data into the at least one frame of content data to form a modulated frame of content data and video synchronization information; and
interleaving the modulated frame of content data within the top and/or bottom video line of the video signal by substituting the modulated frame of content data and video synchronization information into the single top and bottom video line containing luminance information wherein the modulated frame of data having content data and video synchronization information is limited to fit only within the top and/or bottom video line.

24. A method according to claim 23, and further comprising the step of converting the video data stream that has been interleaved with the modulated frame of content data into a video signal that is compliant with a broadcasting format.

25. A method according to claim 24, wherein the broadcasting format for the video signal comprises one of a National Television System Committee (NTSC), Digital Advanced Television Systems Committee (ATSC), Sequentiel Couleur a Memoire (SECAM), or Phase Alternation Line (PAL) compliant broadcasting format.

26. A method according to claim 23, and further comprising the steps of:
broadcasting the video signal;
receiving the broadcasted video signal within a decoder and converting the received video signal into a video data steam; and
extracting the content data from the video data stream.

27. A method of processing a video signal comprising the steps of:
receiving a video signal as a video data stream to be enhanced with content data;
converting content data into frames of content data;
adding video synchronization information and modulation data into the frame of content data to form a modulated frame of content data and video synchronization information;
interleaving the modulated frame of content data and video synchronization information within the top and/or bottom video line of the video data stream by substituting the modulated frame of data into the single top and/or bottom video line containing luminance information;
converting the video data stream into a video signal for broadcast;
receiving the video signal within a decoder and decoding the video signal into a video data stream; and
extracting the content data from the video data stream.

28. A method according to claim 27, wherein the step of extracting comprises the step of restoring a DC bias level for any content data.

29. A method according to claim 27, and further comprising the step of removing system noise and transmission artifacts within a bit and frame synchronizer circuit.

30. A method for encoding information into a video signal comprising the step of:
substituting luminance information within the video signal with a modulated frame of content data and video synchronization information by substituting the modulated frame of content data and video synchronization information into a single top and/or bottom video lie containing luminance information to provide an additional information channel on the video signal wherein the modulated frame of data having content data and video synchronization information is limited to fit only within the top and/or bottom video line; and
forming the modulated frame of content data by coding a stream of content data with error correction and modulation information.

* * * * *

UNITED STATES PATENT AND TRADEMARK OFFICE
CERTIFICATE OF CORRECTION

PATENT NO.        : 7,057,666 B2
APPLICATION NO.   : 09/884897
DATED             : June 6, 2006
INVENTOR(S)       : Folio Page 1 of 2

It is certified that error appears in the above-identified patent and that said Letters Patent is hereby corrected as shown below:

FIGURE 5        Delete: "FIG. 5"
                Insert -- NEW FIG. 5 --

Column 7, Line 35    Delete: "steam"
                     Insert -- stream --

Column 7, Line 44    Delete: "steam"
                     Insert -- stream --

Column 8, Line 45    Delete: "lie"
                     Insert -- line --

Column 9, Line 41    Delete: "steam
                     Insert -- stream --

UNITED STATES PATENT AND TRADEMARK OFFICE
CERTIFICATE OF CORRECTION

PATENT NO. : 7,057,666 B2
APPLICATION NO. : 09/884897
DATED : June 6, 2006
INVENTOR(S) : Folio It is certified that error appears in the above-identified patent and that said Letters Patent is hereby corrected as shown below:

Column 10, Line 34    Delete: "lie"
                                  Insert -- line --

Signed and Sealed this

Fourth Day of September, 2007

JON W. DUDAS
*Director of the United States Patent and Trademark Office*